United States Patent [19]
Reed et al.

[11] Patent Number: 5,741,158
[45] Date of Patent: Apr. 21, 1998

[54] COMMUNICATIONS OUTLET HAVING TERMINATION AID PLATFORM

[75] Inventors: Carl Gene Reed, Clemmons; Terry Lee Pitts, Greensboro, both of N.C.

[73] Assignee: The Whitaker Corporation, Wilmington, Del.

[21] Appl. No.: 681,588

[22] Filed: Jul. 29, 1996

[51] Int. Cl.⁶ .................................................. H01R 13/74
[52] U.S. Cl. .................................................. 439/536
[58] Field of Search .......................... 439/536, 535, 439/540.1, 538, 539

[56] References Cited

U.S. PATENT DOCUMENTS

| | | | |
|---|---|---|---|
| 4,210,380 | 7/1980 | Brzostek | 439/456 |
| 4,389,083 | 6/1983 | Normann et al. | 439/456 |
| 4,477,141 | 10/1984 | Hardesty | 339/122 R |
| 4,669,802 | 6/1987 | Schaffer | 439/535 |
| 4,874,904 | 10/1989 | DeSanti | 350/96.2 |
| 4,894,024 | 1/1990 | Debortoli et al. | 439/535 |
| 4,950,184 | 8/1990 | Caveney et al. | 439/536 |
| 4,976,510 | 12/1990 | Davila et al. | 350/96.2 |
| 5,228,869 | 7/1993 | Below | 439/536 |
| 5,302,140 | 4/1994 | Arnett | 439/557 |
| 5,412,751 | 5/1995 | Siemon et al. | 385/135 |
| 5,484,307 | 1/1996 | Garthwaite et al. | 439/535 |
| 5,484,308 | 1/1996 | Gotz et al. | 439/536 |

FOREIGN PATENT DOCUMENTS

| | | |
|---|---|---|
| 0 718 926 A2 | 12/1994 | European Pat. Off. |
| 0 640 852 A2 | 3/1995 | European Pat. Off. |

*Primary Examiner*—Gary F. Paumen
*Attorney, Agent, or Firm*—Robert Kapalka

[57] ABSTRACT

A communications outlet comprises a base which is mountable on an outlet box to permit interconnections with wires in the outlet box. The base has a mounting cage in which an electrical connector having insulation displacement terminals can be mounted after the wires are terminated to the terminals, and a support platform on which the connector can be seated during insulation displacement termination of the wires to the terminals.

11 Claims, 5 Drawing Sheets

5,741,158

1

COMMUNICATIONS OUTLET HAVING TERMINATION AID PLATFORM

FIELD OF THE INVENTION

The invention relates to a communications outlet which accommodates one or more connectors to provide a matable interface with telecommunications wiring.

BACKGROUND OF THE INVENTION

A mixed media communications outlet which is sold by AMP Incorporated of Harrisburg, Pa. under part number 503999 includes a base which is mountable on an outlet box and which accommodates a number of different connectors for telecommunications wiring. The base accepts fiber optic connectors which are insertable into the base from a front thereof, and these may be installed, removed and replaced when the base is mounted on the outlet box. However, 110-style modular jack connectors are insertable into the base from the rear. Therefore, the 110-style modular jack connectors must be terminated to their respective conductors and installed in the base before the base is mounted on the outlet box, and the base must be removed from the outlet box in order to remove and exchange or repair any of the modular jack connectors after original installation.

Further, the 110-style modular jack connectors which are used with twisted pair wiring have insulation displacement terminals, and a wire insertion, or punchdown, tool must be used to drive the wires into the slots of the terminals. Using the punchdown tool exerts a force on the connector which must be resisted. Since these connectors need to be terminated to wires running within a building, the connectors must be terminated on-site, and it is difficult to adequately support the connectors during the termination. Heretofore, installers have resorted to holding the connector in their hand during termination, or placing the connector against a wall or on a floor for support. Hand-held termination can lead to physical injury. A connector placed against a wall or on a floor is unstable because a modular jack connector has a latch arm protruding from a bottom thereof. Also, a significant length of wire must be drawn out of the outlet box when terminating a connector using these methods. Then, the length of wire must be stuffed back into the outlet box before mounting the base on the box. This is often difficult and may result in undesirable sharp bends and twists in the cable. It would be desirable to have a communications outlet which overcomes these problems.

SUMMARY OF THE INVENTION

A communications outlet comprises a base which is mountable on a wall, a surface mount outlet box, or modular furniture to permit interconnections with communication cables or wires. The base has a mounting cage in which an electrical connector having insulation displacement terminals can be mounted after the wires are terminated to the terminals, and a support platform on which the connector can be temporarily seated during insulation displacement termination of the wires to the terminals.

In a preferred embodiment, the base comprises a plate member having a front face and a rear face, the support platform is disposed on the front face, the mounting cage is disposed rearwardly of the rear face, and the plate member has an opening through which the connector can be inserted from the front for installation in the mounting cage when the base is mounted on the outlet box.

2

BRIEF DESCRIPTION OF THE DRAWINGS

The invention will now be described by way of example with reference to the accompanying drawings wherein.

DETAILED DESCRIPTION OF THE PREFERRED EMBODIMENT

Figure 1:
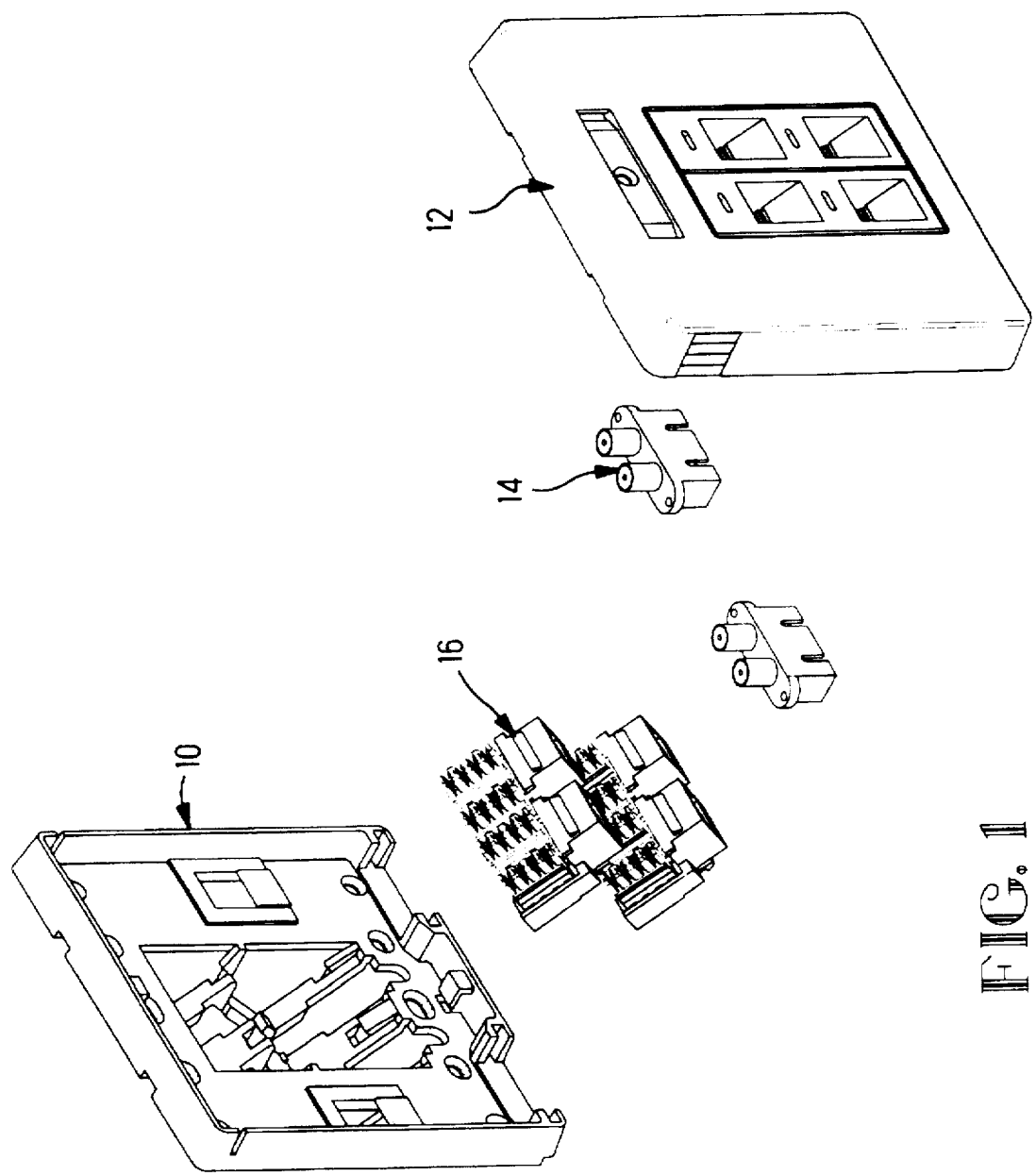
FIG. 1 is an exploded isometric view of a communications outlet assembly according to the invention.

An exploded isometric view of a communications outlet assembly is shown in FIG. 1. The assembly includes a base 10 and a snap-on cover 12 which together provide an enclosure for two fiber optic connectors 14 and four 110-style modular jack connectors 16. The base 10 is mountable over a 2 by 4 or 4 by 4 wall or surface mount outlet box to permit termination of the connectors 14, 16 to associated conductors. The connectors 14, 16 are of types commonly known as a dual SC connector and a 110 panel mount jack, respectively, examples of which are sold by AMP Incorporated of Harrisburg, Pa. under part numbers 504663 and 569014, respectively. It should be understood, however, that a communications outlet according to the invention may be configured to accommodate other styles or types of connectors, and different numbers or arrangements thereof, without departing from the scope of the invention.

Figure 2:
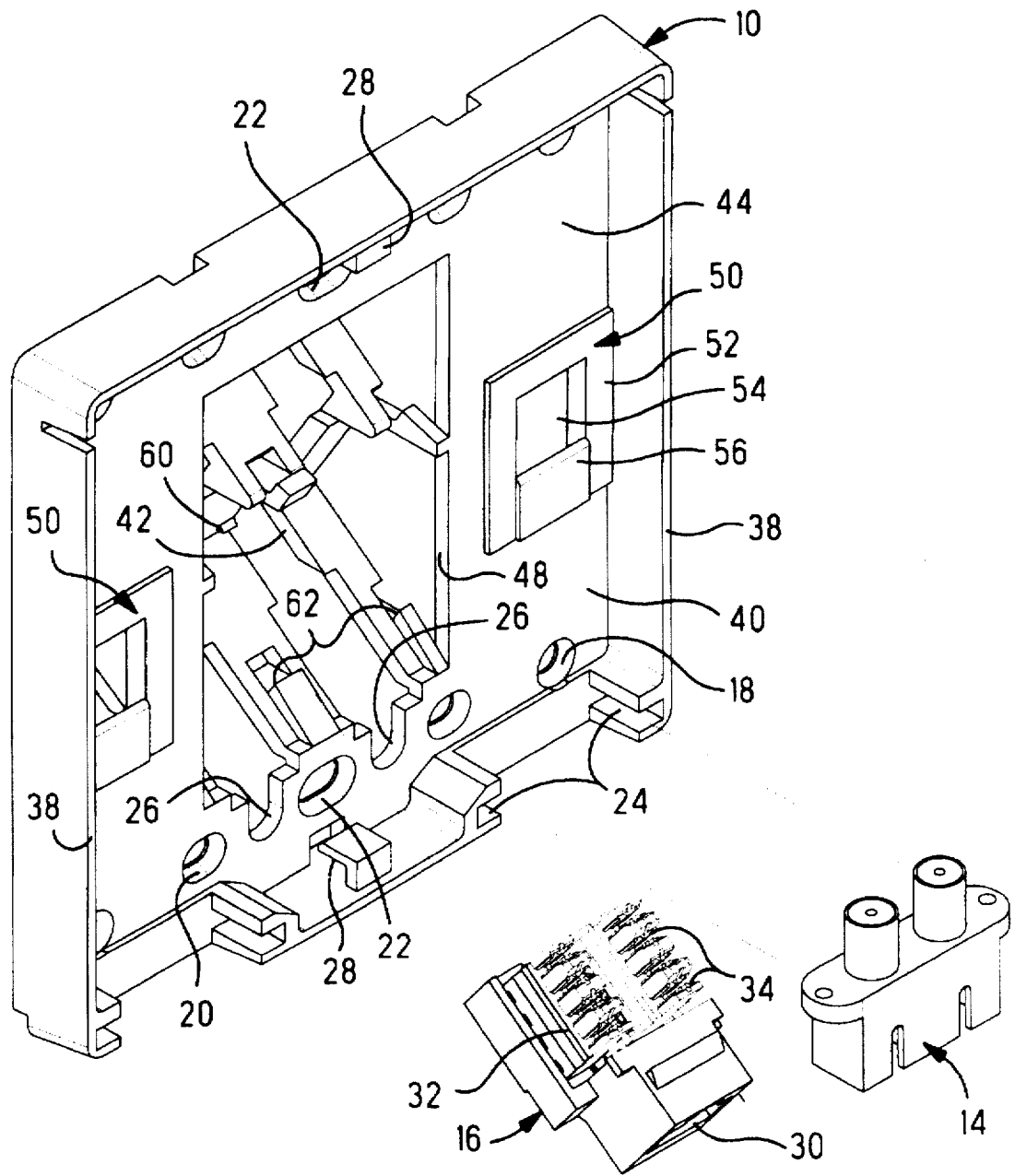
FIG. 2 is a front isometric view of a communication outlet base and representative connectors which may be used therewith.
Figure 3:
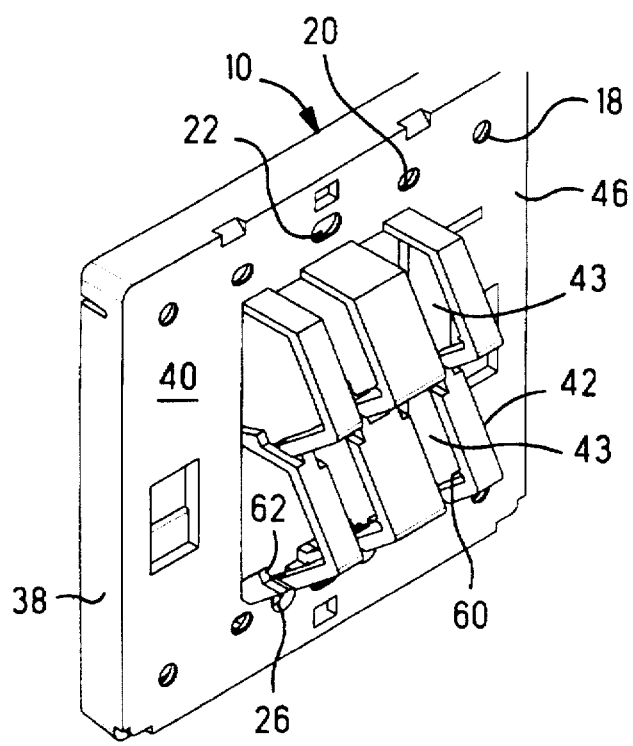
FIG. 3 is a rear isometric view of the communications outlet base.

The base 10 is fastenable to a wall or to any one of several different standard sizes of outlet box which may be recessed in the wall. With reference to FIGS. 2 and 3, the base 10 comprises a plate member 40 and a mounting cage 42. The plate member 40 has elongated mounting holes 22 which can receive threaded fasteners (not shown) for attaching the base 10 to a 2 by 4 outlet box. Holes 20 can receive fasteners for attaching the base to a dual gang box, and holes 18 can receive fasteners for attaching the base to a 4 by 4 box. The plate member 40 has a front face 44, a rear face 46, and an opening 48 between the front and rear faces. Side walls 38 extend forwardly from the front face 44 at a perimeter of the plate member 40. The mounting cage 42 extends rearwardly from the rear face 46 in alignment with the opening 48, so that the mounting cage is disposed behind a wall surface when the base member is mounted thereon.

The base 10 is normally mounted on a recessed wall outlet box prior to termination of the connectors 14, 16 to their respective conductors. The cage 42 has windows 43 through which conductors such as twisted pair cables can pass, and the plate member 40 has windows 26 through which fiber optic conductors can pass.

The base 10 has a number of retention lugs 28. After the connectors 14 are terminated to the fiber optic conductors, excess portions of the fiber conductors can be looped around the retention lugs 28, thereby keeping the fiber conductors in an orderly arrangement and avoiding any sharp bends in the conductors which would exceed the minimum allowable bend radius for fiber conductors. Each of the fiber optic connectors 14 is slidably receivable in a pair of opposed grooves 24 formed in the base 10.

Each of the modular jack connectors 16 includes a connecting port 30 for receiving a mating modular plug, and a 110 style connecting block 32 which has a plurality of insulation displacement terminals 34 for termination of individual wires of twisted pair conductors. Each of the connectors 16 is receivable in a respective chamber of the mounting cage 42. An advantage of the invention is that the connectors 16 are front loaded in the mounting cage 42. Prior to mounting the base 10 on an outlet box, ends of the wires from within the box are drawn through the windows 43 in the mounting cage and through the opening 48 in the plate member so that the wires are accessible at the front of the base 10 for termination to the connectors 16. After termination of the wires to the terminals 34, the terminated connectors 16 are insertable into the cage 42 through the opening 48 in the plate member. The cage 42 has spikes 60 which are received in a slot at the rear of each connector 16, and stop surfaces 62 which engage a corner of each connector 16. The spikes 60 and the stop surfaces 62 provide a means for removably holding the connectors 16 in the cage 42.

Figure 4:
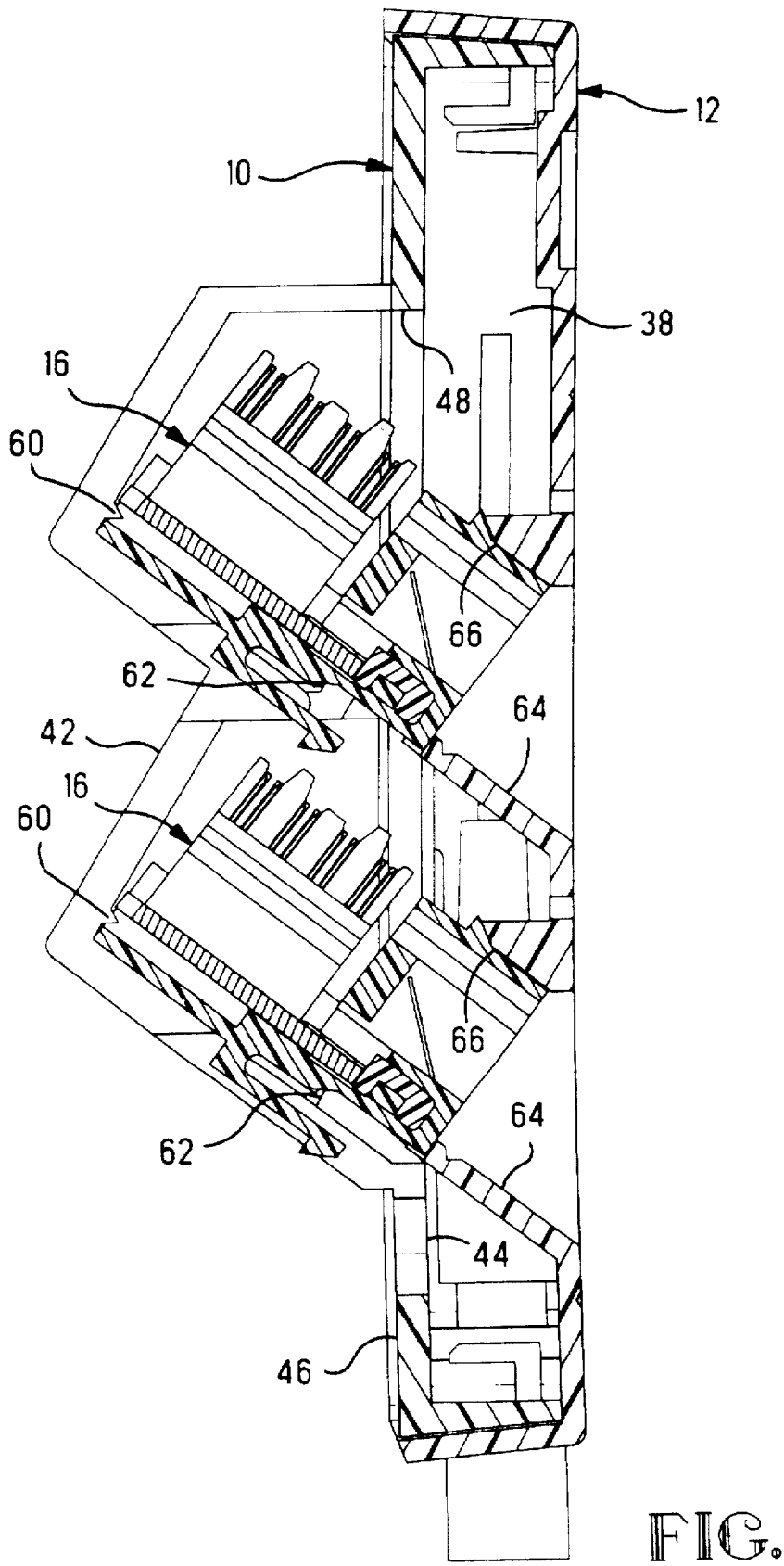
FIG. 4 is a cross-sectional view showing a connector supported in a mounting cage of the base.

As shown in FIG. 4, the connectors 16 are angled after installation in the cage so that mating modular plugs will be angled downwardly along a wall, thereby reducing the outward projection of the modular plug from the wall. The cover 12 has a lower retention arm 64 and an upper retention arm 66 associated with each chamber of the mounting cage 42. The retention arms 64, 66 lock the connectors in the cage 42 when the cover is attached to the base.

Prior to installing the connectors 16 in the cage 42, wires must be terminated to the insulation displacement terminals 34. Since this termination requires that the wires be urged into the slots of the insulation displacement terminals with some force, it is desirable to place the connector 16 against a fixed surface during the termination, rather than in one's hand. However, the connector 16 has a latch arm along a bottom thereof which makes the connector 16 unstable when placed against a floor or a wall. An advantage of the invention is the provision of a seat on the base 10 for supporting the connector during the termination. The base 10 has at least one support platform 50 against which one of the connectors 16 can be placed while the wires are being urged into the terminals 34 of the connector. The support platform 50 is defined by a raised portion 52 on the front face 44 of the plate member 40. The raised portion 52 is configured complementary to a bottom of the connector 16 to provide a stable seat for the connector. The raised portion or seat 52 partially surrounds an aperture 54 in the plate member 40, and a tab 56 extends from the plate member 40 partially across the aperture 54.

Figure 5:
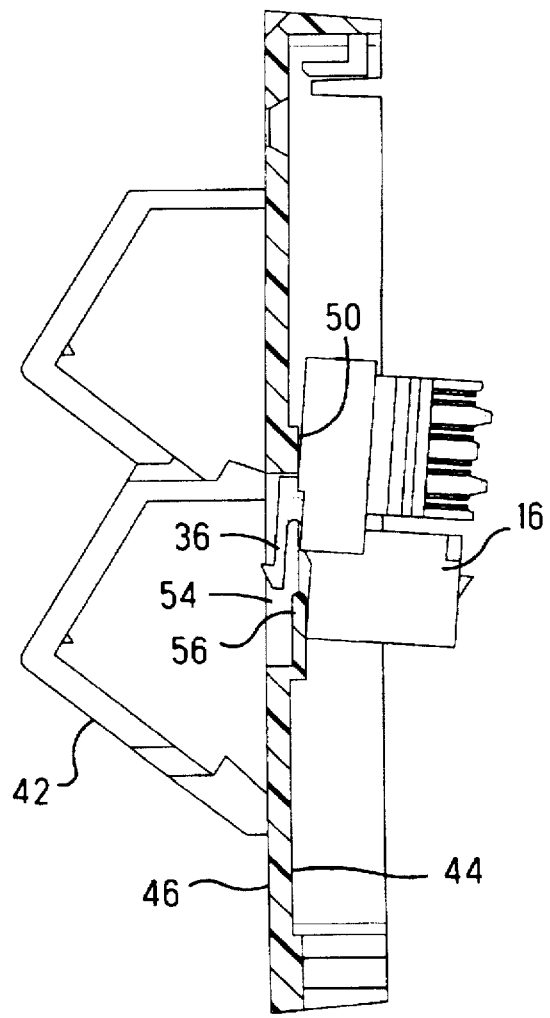
FIG. 5 is a cross-sectional view showing a connector poised for installation on a support platform, of the base.
Figure 6:
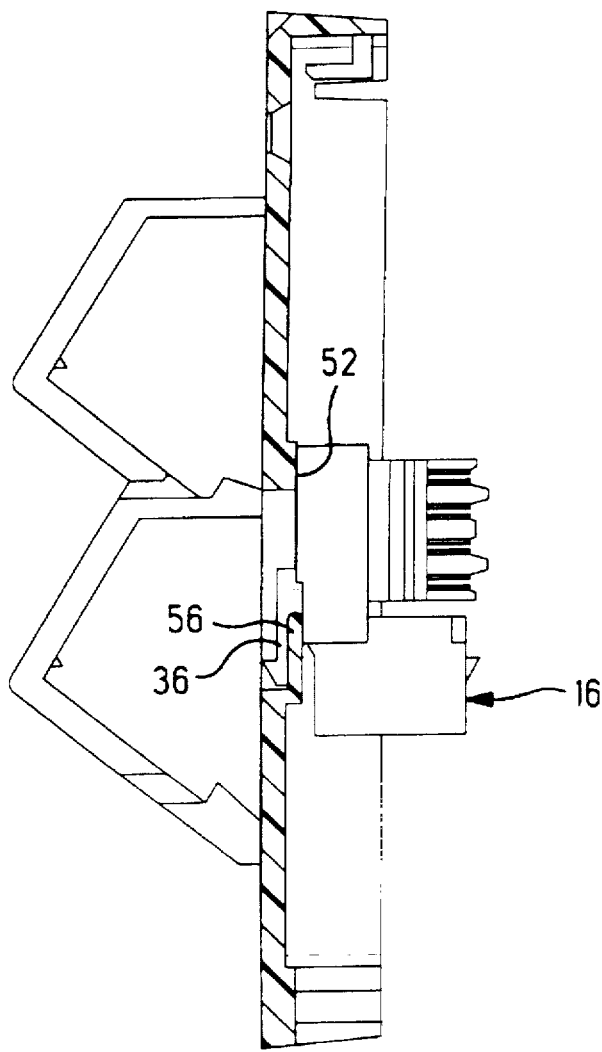
FIG. 6 is a cross-sectional view of the connector installed on the support platform.
Figure 7:
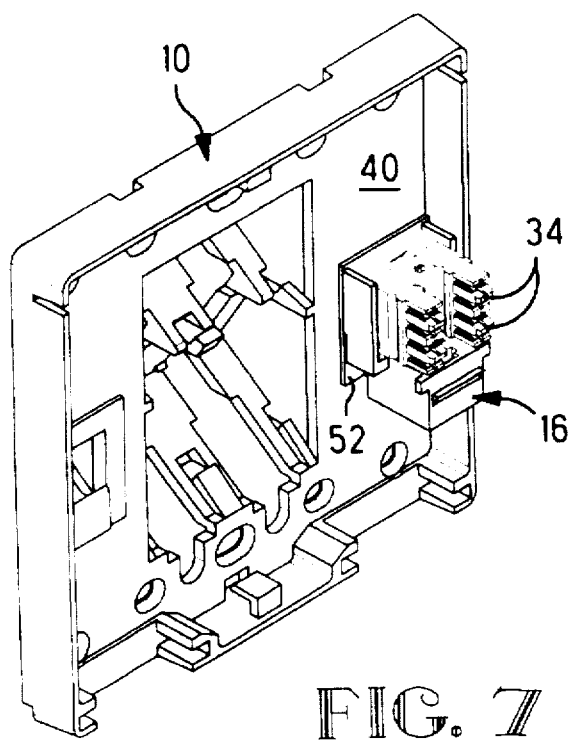
FIG. 7 is a front isometric view of the connector installed on the support platform.

The connector 16 is installed on the support platform 50 by first inserting latch arm 36 of the connector through the aperture 54 in the plate member, as shown in FIG. 5. The connector is then moved downwardly along the support platform to bring the latch arm 36 fully behind the tab 56 to the position shown in FIG. 6. The tab 56 cooperates with the latch arm 36 to maintain the connector 16 on the seat, as shown in FIG. 7. An installer can then use a punchdown tool to urge the wires into the slots of the terminals 34 for insulation displacement termination. Forces applied by the punchdown tool are transferred through the seat 52 to the wall or the outlet box to which the base is attached.

The base 10 shown in the drawings has two of the support platforms 50, one on each side of the mounting cage 42. A connector to be terminated can be placed on the closest support platform, thereby minimizing the length of cable which must be drawn from the outlet box, and avoiding interference between the cable and adjacent connectors in the mounting cage during the termination.

A communication outlet according to the invention has a number of advantages. Connectors are front loaded in the outlet after the outlet is mounted on a wall. Therefore, defective connectors can be replaced without removing the outlet from the wall. Further, the outlet has a stable platform for supporting an insulation displacement type connector during termination of wires to the connector. Since the platform is in close proximity to a mounting cage for the connector, only short lengths of cable need to be brought out of the wall for termination, and these short lengths are easily stored in the outlet box after termination while maintaining the desired minimum bend radius. Also, the outlet has retention lugs for securing approximately one meter lengths of fiber optic conductors in an orderly array at the desired minimum bend radius.

The invention having been disclosed, a number of variations will now become apparent to those skilled in the art. Whereas the invention is intended to encompass the foregoing preferred embodiments as well as a reasonable range of equivalents, reference should be made to the appended claims rather than the foregoing discussion of examples, in order to assess the scope of the invention in which exclusive rights are claimed.

We claim:

1. A communications outlet comprising:
    a base which is mountable on an outlet box to permit interconnections with wires in the outlet box, the base including a plate member having a front face and a rear face, a mounting cage disposed rearwardly of the rear face in which an electrical connector having insulation displacement terminals can be mounted after the wires are terminated to the terminals, a support platform on the front face which is specially configured to support the connector during insulation displacement termination of the wires to the terminals, and the plate member having an opening through which the connector can be inserted for installation in the mounting cage while the base is mounted on the outlet box.

2. The communications outlet according to claim 1, wherein the mounting cage has an opening which permits ends of the wires to be drawn through the cage and through the opening in the plate member so that the ends may be disposed at the support platform for termination to the connector while the base is mounted on the outlet box.

3. The communications outlet according to claim 1, wherein the support platform is defined by a raised seat on the plate member which is configured complementary to a bottom of the connector.

4. The communications outlet according to claim 3, wherein the plate member has a tab which is cooperable with a latch arm of the connector to stabilize the connector on the support platform.

5. The communications outlet according to claim 1, wherein the base has retention lugs around which fiber optic conductors can be looped.

6. The communications outlet according to claim 1, further comprising a cover which is removably attachable to the base.

7. A communications outlet comprising:
    a base and associated cover for use in wall, surface mount or furniture applications to facilitate termination of either or both copper and fiber optic telecommunications cables, the base including a plate member having a front face and a rear face, a support platform disposed on the front face which is specially adapted to hold a connector during termination of the connector to one of the cables, the base also having a mounting cage disposed rearwardly of the rear face that provides front access through an opening in the plate member to quickly install, inspect, test, repair, or replace terminated connectors while the base is mounted on an outlet box, and the base providing mounting means for one or more dual fiber optic connectors, the cover providing additional retention means for internally mounted connectors.

8. The communications outlet according to claim 7, wherein the mounting cage has an opening which permits ends of the cables to be drawn through the cage and through the opening in the plate member so that the ends may be disposed at the support platform for termination to the connector while the base is mounted on the outlet box.

9. The communications outlet according to claim 7, wherein the support platform is defined by a raised seat on the plate member which is configured complementary to a bottom of the connector.

10. The communications outlet according to claim 9, wherein the plate member has a tab which is cooperable with a latch arm of the connector to stabilize the connector on the support platform.

11. The communications outlet according to claim 7, wherein the base has retention lugs around which the fiber optic cables can be looped.

* * * * *